United States Patent
Platz et al.

(10) Patent No.: US 8,543,709 B2
(45) Date of Patent: *Sep. 24, 2013

(54) METHOD FOR CONTROLLING A TRANSMISSION SYSTEM AS WELL AS A TRANSMISSION SYSTEM

(75) Inventors: Rainer Platz, Colombier (CH); Thomas Von Dach, Cressier (CH)

(73) Assignee: Phonak AG, Staefa (CH)

( * ) Notice: Subject to any disclaimer, the term of this patent is extended or adjusted under 35 U.S.C. 154(b) by 632 days.

This patent is subject to a terminal disclaimer.

(21) Appl. No.: 12/723,845

(22) Filed: Mar. 15, 2010

(65) Prior Publication Data

US 2010/0172526 A1    Jul. 8, 2010

Related U.S. Application Data

(63) Continuation of application No. 11/537,782, filed on Oct. 2, 2006, now Pat. No. 7,698,440.

(51) Int. Cl.
*G06F 15/16* (2006.01)

(52) U.S. Cl.
USPC ............ 709/228; 709/220; 709/227; 709/231

(58) Field of Classification Search
USPC .................................. 709/220, 227, 228, 231
See application file for complete search history.

(56) References Cited

U.S. PATENT DOCUMENTS

| | | | |
|---|---|---|---|
| 5,983,272 A | 11/1999 | Rosen et al. | |
| 6,295,291 B1 | 9/2001 | Larkins | |
| 6,449,715 B1 * | 9/2002 | Krivoshein | 713/1 |
| 6,578,200 B1 | 6/2003 | Takao et al. | |
| 8,103,445 B2 * | 1/2012 | Smith et al. | 340/995.14 |
| 2004/0213285 A1 * | 10/2004 | Stevenson et al. | 370/465 |
| 2004/0260798 A1 | 12/2004 | Addington et al. | |
| 2005/0204053 A1 | 9/2005 | Sheehan | |
| 2007/0083873 A1 * | 4/2007 | Roychoudhury et al. | 719/321 |
| 2010/0217854 A1 * | 8/2010 | Durairaj et al. | 709/223 |
| 2010/0287533 A1 * | 11/2010 | Tysowski et al. | 717/121 |
| 2010/0327187 A1 * | 12/2010 | Beloussov et al. | 250/492.1 |
| 2011/0161651 A1 * | 6/2011 | Leigh et al. | 713/2 |

FOREIGN PATENT DOCUMENTS

| | | |
|---|---|---|
| EP | 0537026 A2 | 4/1993 |
| EP | 1531650 A2 | 5/2005 |
| WO | 0154458 A2 | 7/2001 |
| WO | 0223948 A1 | 3/2002 |

OTHER PUBLICATIONS

International Search Report for PCT/EP2006/066969 dated Jul. 5, 2007.

* cited by examiner

*Primary Examiner* — Phuoc Nguyen
(74) *Attorney, Agent, or Firm* — Pearne & Gordon LLP

(57) ABSTRACT

A transmission system and a method for controlling the transmission system comprising at least one interface unit and at least one adjustable device are disclosed. The method includes configuring the at least one interface unit according to interface configuration parameters, and enabling the at least one interface unit according to the interface configuration parameters. The method can also include transmitting device configuration parameters from the at least one interface unit to at least one of the adjustable devices, configuring the at least one adjustable device according to the device configuration parameters, and enabling the at least one adjustable device according to the device configuration parameters in order to transmit data via the second link.

34 Claims, 2 Drawing Sheets

METHOD FOR CONTROLLING A TRANSMISSION SYSTEM AS WELL AS A TRANSMISSION SYSTEM

TECHNICAL FIELD

The present invention is related to a method for controlling a transmission system by adjusting one or more of its components comprising at least one interface unit and at least one adjustable device, as well as to a transmission system. Particularly, the present invention is directed to hearing devices, its adjustments as well as the transmission of data to hearing devices.

BACKGROUND OF THE INVENTION

A method for controlling a transmission system consisting of several transmitters and receiving units is disclosed in WO 02/23 948 A1. According to this known teaching, configuration parameters are transmitted to the receiving units via a control channel. This transmission via the control channel takes place independently of any transmission that may take place via a data channel. Although the configuration of the receiving units is rather easy and straight forward, the configuration of the transmitter is awkward and time consuming because they must be preconfigured before the transmission system is put into operation.

Therefore, it is an object of the present invention to provide for a method for adjusting a transmission system that does at least not have the above-mentioned disadvantage.

SUMMARY OF THE INVENTION

The present invention is directed to a method for controlling a transmission system by adjusting one or more of its components comprising at least one interface unit and at least one adjustable device, the method comprising the steps of:
  configuring the at least one interface unit according to interface configuration parameters,
  enabling the at least one interface unit according to the interface configuration parameters in order to transmit data via the first link,
  transmitting device configuration parameters from the at least one interface unit to at least one of the adjustable device via a second link,
  configuring the at least one adjustable device according to the device configuration parameters, and
  enabling the at least one adjustable device according to the device configuration parameters in order to transmit data via the second link.

One embodiment of the method according to the present invention is characterized by further comprising the step of receiving interface configuration parameters and device configuration parameters into at least one interface unit via a first link.

A further embodiment of the present invention is characterized by further comprising the step of transmitting data via the second link in a unidirectional manner from the at least one interface unit to the at least one adjustable device.

A further embodiment of the present invention is characterized by further comprising the step of transmitting data in a bidirectional manner via the second link.

A further embodiment of the present invention is characterized in that the second link comprises a short-range link covering up to a distance of 1 meter (one meter) between transmitter and receiver as well as a long-range link covering up to a distance of 100 meters.

A further embodiment of the present invention is characterized by further comprising the steps of
  transmitting the device configuration parameters via the short-range link, and
  transmitting data via the long-range link.

A further embodiment of the present invention is, characterized by further comprising the steps of
  transmitting the interface configuration parameters from the at least one interface unit to at least one further interface unit via a third link,
  configuring the at least one further interface unit according to the configuration parameters,
  enabling the at least one further interface unit according to the configuration parameters,
  transmitting device configuration parameters from the at least one further interface units to at least one further adjustable device via a fourth link,
  configuring the at least one further adjustable device according to the device configuration parameters, and
  enabling the at least one further adjustable device according to the device configuration parameters in order to transmit data via the fourth link.

A further embodiment of the present invention is characterized by further comprising the step of transmitting data via the fourth link in a unidirectional manner from the at least one further interface unit to the at least one further adjustable device.

A still further embodiment of the present invention is characterized by further comprising the step of transmitting data in a bidirectional manner via the fourth link.

A yet another embodiment of the present invention is characterized in that the fourth link comprises a further short-range link covering up to a distance of 1 meter (one meter) between transmitter and receiver as well as a further long-rang link covering up to a distance of 100 meters.

A further embodiment of the present invention is characterized by further comprising the steps of
  transmitting the device configuration parameters via the further short-range link, and
  transmitting data via the further long-range link.

A further embodiment of the present invention is characterized in that the interface configuration parameters and the device configuration parameters are received from a control unit into the at least one interface unit via the first link.

A further embodiment of the present invention is characterized by further comprising the step of transmitting data in a bidirectional manner via the first link.

A further embodiment of the present invention is characterized by further comprising the step of exchanging or receiving data and/or configuration parameters via a network to which at least one of a server, a remote server, an internal storage unit and an external storage unit is connected.

A further embodiment of the present invention is characterized in that at least a part of the network belongs to the internet.

A further embodiment of the present invention is characterized by further comprising the step of addressing at least one of the adjustable devices by a unique identification code.

Furthermore, the present invention is directed to a transmission system comprising
  at least one interface unit,
  at least one adjustable device,
  means for configuring the at least one interface unit according to interface configuration parameters,
  means for enabling the at least one interface unit according to the interface configuration parameters in order to transmit data via the first link, means for transmitting device configuration parameters from the at least one interface unit to at least one of the adjustable device via a second link, means for configuring the at least one adjustable device according to the device configuration parameters, and means for enabling the at least one adjustable device according to the device configuration parameters in order to transmit data via the second link.

An embodiment of the system according to the invention is characterized by further comprising means for receiving interface configuration parameters and device configuration parameters into at least one interface unit via a first link.

A further embodiment of the system according to the invention is characterized by further comprising means for transmitting data via the second link in a unidirectional manner from the at least one interface unit to the at least one adjustable device.

A further embodiment of the system according to the invention is characterized by further comprising means for transmitting data in a bidirectional manner via the second link.

A further embodiment of the system according to the invention is characterized in that the second link comprises a short-range link covering up to a distance of 1 meter (one meter) between transmitter and receiver as well as a long-range link covering up to a distance of 100 meters.

A further embodiment of the system according to the invention is characterized by further comprising
means for transmitting the device configuration parameters via the short-range link, and
means for transmitting data via the long-range link.

A further embodiment of the system according to the invention is characterized by further comprising
means for transmitting the interface configuration parameters from the at least one interface unit to at least one further interface unit via a third link,
means for configuring the at least one further interface unit according to the configuration parameters,
means for enabling the at least one further interface unit according to the configuration parameters,
means for transmitting device configuration parameters from the at least one further interface units to at least one further adjustable device via a fourth link,
means for configuring the at least one further adjustable device according to the device configuration parameters, and
means for enabling the at least one further adjustable device according to the device configuration parameters in order to transmit data via the fourth link.

A further embodiment of the system according to the invention is characterized by further comprising means for transmitting data via the fourth link in a unidirectional manner from the at least one further interface unit to the at least one further adjustable device.

A still further embodiment of the system according to the invention is characterized by further comprising means for transmitting data in a bidirectional manner via the fourth link.

A further embodiment of the system according to the invention is characterized in that the fourth link comprises a further short-range link covering up to a distance of 1 meter (one meter) between transmitter and receiver as well as a further long-rang link covering up to a distance of 100 meters.

A further embodiment of the system according to the invention is characterized by further comprising
means for transmitting the device configuration parameters via the further short-range link, and
means for transmitting data via the further long-range link.

A further embodiment of the system according to the invention is characterized in that the interface configuration parameters and the device configuration parameters are receivable from a control unit into the at least one interface unit via the first link.

A further embodiment of the system according to the invention is characterized by further comprising means for transmitting data in a bidirectional manner via the first link.

A further embodiment of the system according to the invention is characterized by further comprising means for exchanging or receiving data and/or configuration parameters via a network to which at least one of a server, a remote server, an internal storage unit and an external storage unit is connected.

A further embodiment of the system according to the invention is characterized in that at least a part of the network belongs to the internet.

A further embodiment of the system according to the invention is characterized by further comprising the step of addressing at least one of the adjustable devices by a unique identification code.

A further embodiment of the system according to the invention is characterized in that an interface unit and an adjustable device are incorporated into a single unit.

The present invention is further described in detail by referring to drawings showing specific embodiments. These embodiments are for illustrative purposes only and shall not be used to limit the scope of the present invention.

DETAILED DESCRIPTION OF THE INVENTION

Figure 1:
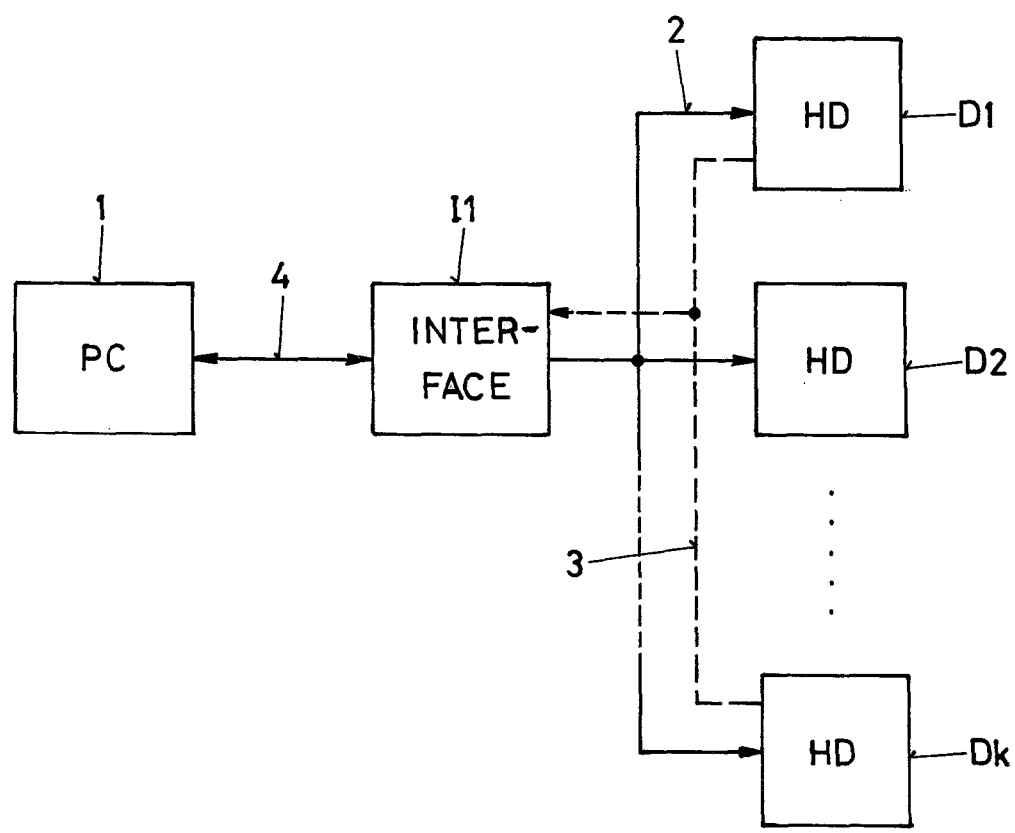
FIG. 1 shows a first embodiment for a transmission system according to the present invention, the system being operate-able according to a first inventive method.

FIG. 1 shows a first embodiment for a transmission system of the present invention that comprises a control unit 1, an interface unit I1 and several adjustable devices D1 to Dk, wherein k is a positive integer. The interface unit I1 is connected, on the one side, to the control unit 1 via a first link 4, and, on the other side, to the adjustable devices D1 to Dk via a second link 2, 3. While the first link 4 typically is a wired bidirectional connection, e.g. implemented according to the USB—(Universal Serial Bus) standard, in particular a so-called mini USB, the second link 2, 3 typically is a wireless connection.

In a first embodiment, the second wireless link 2, 3 comprises a combination of a unidirectional narrow-band frequency-modulated (FM) signal transmission with a carrier frequency in the VHF or UHF range with a digital bidirectional data link. The latter can advantageously be executed in the ISM bands between 13.56 MHz and 2.4 GHz or also at lower frequencies, allowing for low-power digital links.

In a second embodiment, the second wireless link 2, 3 comprises a digital bidirectional link carrying an audio and a data signal. Such a link can be implemented in the ISM bands between 13.56 MHz and 2.4 GHz, for example.

Nevertheless, the second link 2, 3 is either a unidirectional or a bidirectional connection dependent on the specific application. In case of implementing only a unidirectional connection, transmission of information always takes place from the interface unit I1 towards the adjustable device D1 to Dk, as it is indicated by the solid line 2 compared to the dashed line 3 referring to the opposite direction.

Therefore, in a further embodiment, the second wireless link 2 comprises a unidirectional connection carrying narrow-band frequency modulated (FM) signals with carrier frequencies in the VHF or UHF range. Both audio and data signals are transmittable.

In another embodiment of the present invention, the first link 4 is also a wireless connection; thereby the so-called Bluetooth-standard can be used among others.

In another embodiment of the present invention, the second link 2, 3 is a wired connection. It is pointed out that for the different links described herein, either wired or wireless links can be implemented without departing from the scope of the present invention. In other words, any combination of wired and wireless links is feasible by using any type of standards presently known.

The control unit 1 may be a commercially available device such as a personal computer or the like, having its standard components such as a display, an input unit, an output unit, interfaces, etc. (not depicted in FIG. 1). The control unit 1 provides configuration parameters in order to configure the transmission system, which comprises, in its simplest form, the interface unit I1 and one adjustable device D1. Apart from the implemented type of link between the components, i.e. between the interface unit I1 and the adjustable device D1, the configuration parameters provided by the control unit 1 are used to configure and enable the interface unit I1 and the adjustable device D1. The control unit 1 transmits the configuration parameters to the interface unit I1 via the first link 4. On the receiving side of this transmission, the configuration parameters are used to configure the interface unit I1 in order to get ready for operating and contacting the adjustable device D1 or adjustable devices D1 to Dk. Once the interface unit I1 is configured and its operation according to the configuration is enabled, the device configuration parameters are transmitted from the interface unit I1 to the adjustable device D1 and, if present, also to adjustable devices D2 to Dk. As soon as the transmission of the device configuration parameters has been completed, the adjustable devices D1 to Dk are configured and enabled in order to be operational.

The adjustable devices D1 to Dk may have one or more of the following functionalities and/or properties:
FM—(Frequency Modulation) receiver that is able to receive and interpret the received data, in particular the received configuration parameters;
hearing device that is used to improve the hearing ability of a person having a hearing impairment as well as to improve communication for a person having normal hearing abilities;
hearing device that is implantable into the body of a hearing impaired person;
communication device;
transmitter;
short-range transmitter for the transmission of configuration parameters, for example.

The interface unit I1 may have one or more of the following functionalities and/or properties:
fitting unit, which may require fitting or configuration as explained above;
transmitter, e.g. also implemented using a FM module, to transmit an audio signal, for example, via a long-range transmission channel;
remote control for one or several hearing devices or communication devices;
dedicated device to provide an interface between a control unit and a adjustable device.

Figure 2:
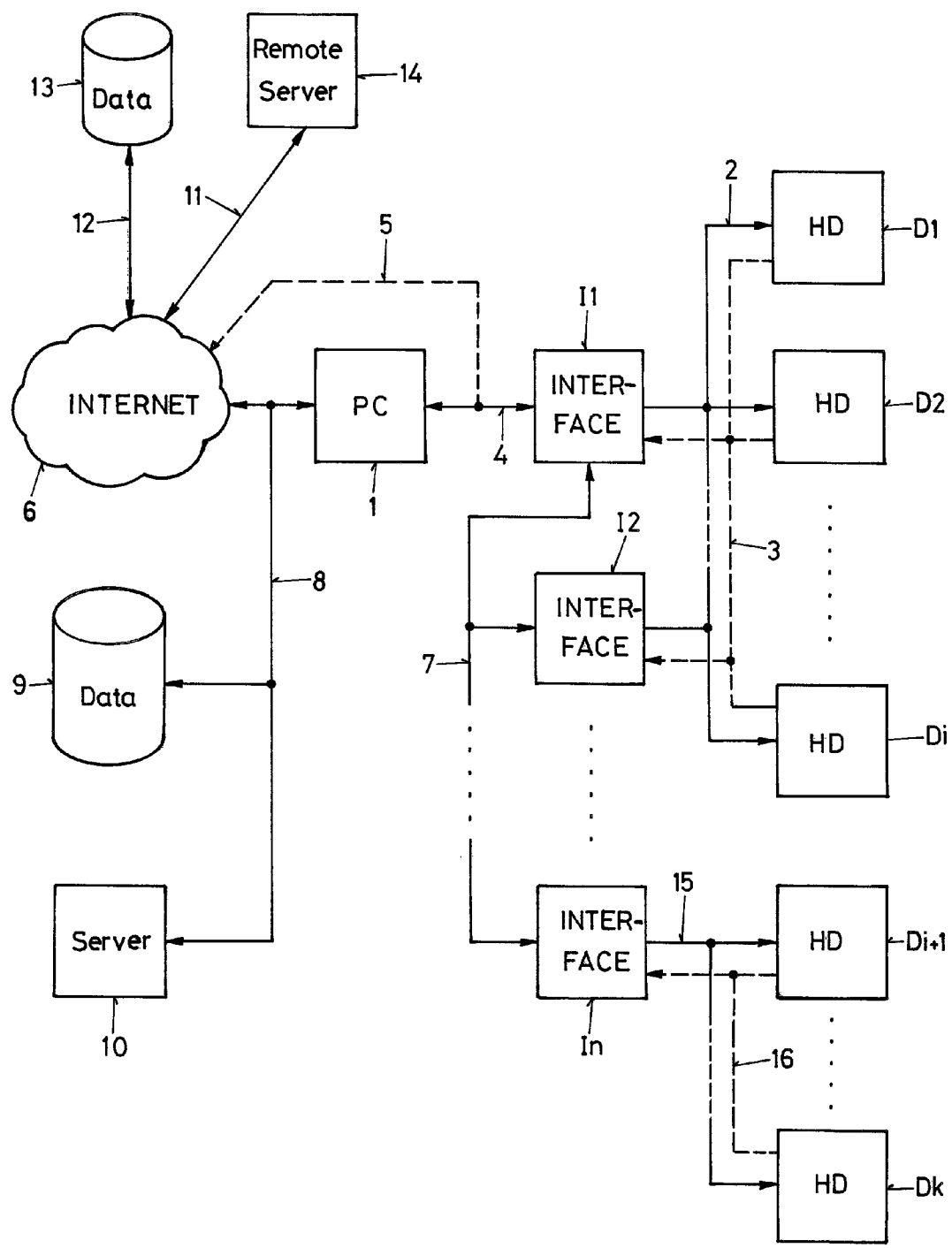
FIG. 2 shows a second embodiment for a transmission system according to the present invention, the system also being operate-able according to a second inventive method.

In FIG. 2, a further embodiment of the present invention is depicted. In addition to the control unit 1, the interface unit I1 and the adjustable devices D1 to Dk of FIG. 1, additional components are shown. First, several interface units I1 to In, n being an positive integer, are depicted that are operationally interconnected via a third link 7. Again, the interface units I1 to In are configured through interface configuration parameters obtained from the control unit 1 that is, as depicted in FIG. 2, connected to interface unit I1. The configuration of the further interface units I2 to In is performed by the interface unit I1 via the third link 7.

In a further embodiment that is not shown in FIG. 2, the interface configuration parameters for the further interface units I2 to In are directly transmitted to the respective further interface units I2 to In, i.e. all interface units I1 to In are directly configured by the control unit 1.

The further interface units I2 to In may be connected to the same adjustable devices D1 to Di as the interface unit I1. In contrast thereto, not all interface units I1 to In are connected to all adjustable devices D1 to Dk. For example, and as depicted in FIG. 2, the interface units I1 and I2 are connected to the adjustable devices D1 to Di, whereas the interface unit In is only connected to the adjustable devices Di+1 to Dk. Accordingly, groups of adjustable devices can be formed as it is of great advantage in specific applications. One such application is given, for example, when using the transmission system of the present invention in a school environment, in which each student wears a hearing device and the teacher can individually address a student or several students at the same time. Thereby, the teacher can dynamically form groups of students that he wishes to address.

In another application of the present invention, some of the adjustable devices are used as transmitters that are used to broadcast an audio signal, for example. Other adjustable devices can be tuned to one of the broadcasted signals in order to receive the corresponding audio signal. With an eye towards the block diagram of FIG. 2, the adjustable devices D1 to Di can be identified as the transmitters mentioned above, while the adjustable devices Di+1 to Dk being able to receive the broadcasted audio signals can be identified as the hearing devices mentioned above. The control unit 1 is the central unit, which directly controls the behavior of the interface units I1 to In as well as, although indirectly, the adjustable devices D1 to Dk. Once the transmission system is configured, the control unit 1 might only have little or even no more influence. Instead, the interface unit I1 to In can be used to address the adjustable devices D1 to Dk in order that their behavior changes. For example, the interface unit I1 is used to switch off the adjustable device D2 because it is no longer needed. Therefore, corresponding input means are provided on the interface unit I1. Or, to give a further example of the flexibility of the transmission system, the interface unit In that controls the adjustable devices Di+1 to Dk being hearing devices worn by students is designed as remote control. The remote control enables the teacher that a specific student or his hearing device, respectively, is tuned to a specific transmitter, i.e. to one of the adjustable devices D1 to Di acting as transmitters. Again, such a remote control incorporates a number of input means to enable the above-described switching.

In yet another application, the transmission system according to the present invention is used to adjust a hearing device to specific needs of the hearing device user. The adjustment is performed during a so-called fitting session during which an audiologist configures and enables the hearing device or devices to be worn by the user. Generally, the audiologist would first configure an interface unit, which is capable to being able to establish a communication with a transceiver unit incorporated in the hearing device subject for programming. The configuration is done via a control unit 1, e.g. a commercially available personal computer having specific communication means such as a Bluetooth device. The interface unit, also equipped with Bluetooth device in order to be able to receive the configuration parameters from the control unit 1, establishes a communication link to the desired hearing device—or hearing devices in case of a binaural hearing system—in order to configure the hearing device or devices, respectively, according to the needs of the hearing system user.

The embodiment depicted in FIG. 2 contains, compared to the embodiment depicted in FIG. 1, a number of additional components. In dependence on the selection of one or more of the additional components, a number of further embodiments of the present invention are conceivable.

Thus, the control unit 1 is further connectable to a network that opens up the possibility to have access to additional data. This data can be stored in a local storage unit 9 or a local server unit 10, which can be accessed via a local network 8. A further extension to the accessibility can be provided by a gateway to the internet 6 that is connected via the local network 8. Therewith, external data can be accessed that is stored in an external data storage unit 13 or on a remote server 14 if the external storage unit 13 and/or the remote server 14 are connected to the internet via corresponding links 11 and 12.

In a further embodiment of the present invention, the control unit 1 is circumvented by a connection 5 that operationally connects the interface unit D1 to the network 6. This opens up the possibility to control the behavior of the interface unit I1—and possibly also the further interface unit I2 to Ik—and the adjustable devices D1 to Dk via a remote server 14 or the like. The interface unit I1 may be a mobile phone that already provides basic means for accessing a remote server via the network 6, e.g. the internet. This set-up even opens up the possibility of a remote fitting session, in which there is no need that a hearing device user must visit an audiologist for adjusting or further adjusting the settings of his hearing system.

The general concept of the present invention, as depicted in the block diagram of FIG. 2, opens up the following applications and advantages, which are particularly suitable to be applied—but not limited—to the technical field of hearing devices and communication devices.

Fully Integrated Workflow:

For a transmission system comprising one or more adjustable devices D1 to Dk and one or more interface units I1 to In, some configuration parameters are common to the adjustable devices D1 to Dk and to the interface units I1 to In, some configuration parameters only concern the adjustable devices D1 to Dk—the so-called device configuration parameters—, and others only concern the interface units I1 to In—the so-called interface configuration parameters. As has already been pointed out, it is desirable to prepare the configuration parameters for the entire transmission system in the control unit 1 before configuring the entire transmission system. During configuration, the entire data set is transferred via the first link 4 to the interface unit I1, which retains the interface configuration parameters addressed to the interface unit I1 and transmits the configuration parameters addressed to the adjustable devices D1 to Dk.

As an example for a FM—(frequency modulated) transmission system, e.g. frequencies, user data (like name of the user, school, teacher) will be required in the interface unit I1 as well as in the adjustable device D1 to Dk, transmitter configuration parameters such as enabling or disabling of particular functionalities, RF-specific configuration parameters and the like are required only in the interface unit I1—possibly also in the further interface units I2 to In—, and others such as output gain parameters, switch enabling or disabling are only required in the adjustable device D1 to Dk, which may be a receiver, transmitter or a hearing device incorporating a receiver or transmitter. Likewise, a hearing system comprising a hearing device (adjustable device D1) and a remote control (interface unit I1) is configured by the user. Advantageously, they are simultaneously programmed or configured, respectively. For a binaural hearing system comprising two hearing devices (adjustable devices D1 and D2), it is desirable to fit both hearing devices at the same time.

Multi-fitting of Hearing Devices:

In a further embodiment, one interface unit I1 is able to configure several hearing devices (adjustable devices D1 to Dk) in a single operation. In order to do so, one hearing device D1 is addressed by means of a unique identification code. Other hearing devices D2 to Dk that are within the transmission range of the interface unit I1 do not react if the identification code does not match.

The identification code might be a serial number or another customer-specific key stored in the hearing device D1. The identification code might also be a group identification code, representing e.g. a school class. In the latter case, a group of hearing devices D1 to Di (FIG. 2) having the same identification code would be addressed and/or configured at the same time.

Offline Mode and Portable Fitting Device:

In a further embodiment, the interface unit I1 is implemented in such a manner that the first link 4, 5 to the control unit 1, respectively the network 6, is not necessary in order to be able to perform a configuration or fitting of one or more adjustable devices D1 to Dk. Such a configuration is referred to as off-line mode, and the transmission system is referred to as a portable fitting device. The interface unit I1 becomes a portable offline unit that is easily and comfortably configurable via the first link 4, 5, and that allows, after configuring and disconnecting from the control unit 1, using one or more adjustable devices D1 to Dk in an off-line manner. It therefore combines the convenience and advantages of a standalone solution with the convenience and advantages of a professional user interface connected to a control unit 1 and its database.

In a further embodiment of the present invention, the configuration parameters used in the off-line mode is a subset of the configuration parameters used in an on-line mode.

Remote Fitting:

In a further embodiment, the second link 2 being a wireless link is a unidirectional long-distance link and is used to change certain configuration parameters in the adjustable devices D1 to Dk by way of commands. These commands are either broadcast commands, i.e. acting on all adjustable devices within the range of the second link 2, or they are commands addressing only adjustable devices D1 to Di having a matching identification code. For example, the described procedure can be implemented for a reprogramming of a default frequency, of gain values or the like.

In a further embodiment of the present invention, the adjustable devices D1 to Dk are configured or maintained from a server, being either the local server 10 or the remote server 14. Again, the configuration can be carried out via the control unit 1 or via the first link 5 bypassing the control unit 1. This embodiment allows a remote service center to configure or trouble-shoot a customer's transmission system, i.e. its interface unit I1 to In and/or its adjustable devices D1 to Dk.

Stored Links:

In a further embodiment, any component within the network or transmission system depicted in FIG. 2 can be addressed from any point within the network. For example, the interface unit I1 comprises links to a web site comprising information concerning the product and/or a website providing the fitting/programming application for fitting or programming, respectively, the adjustable device or devices D1 to Dk. Alternatively, such links are stored by the audiologist. For example, a personalized help information to be displayed on a display unit of the control unit 1 can be stored either in the interface unit I1 itself, or as a link to information on a server 10, 14 in the interface unit I1. Such a personalized help comprises, for example, a list of devices, customer name, configuration, focused news, contact data etc.

Embedded Applications:

In a more specific embodiment of the present invention, applications are embedded in the interface unit I1 to In to be run on a control unit 1. Such an embedded application can be a fitting application, for example, which can be loaded to and run on the control unit 1 for performing its functions.

Firmware Updates:

The firmware running on an interface unit I1 to In and/or on an adjustable device D1 to Dk can be updated via the transmission system provided by the present invention.

Networked Applications:

Country specific settings, such as e.g. locally permitted carrier-frequencies, can be taken from a database located at e.g. a national sales organization during the fitting/configuration process. Global settings updates, such as e.g. an optimized base configuration, may be taken from a database located at the headquarters, for example. The databases are provided on the external data storage unit 13, for example.

A more detailed network for a FM transmission system in the school market comprises a selection of one or more of the following:
headquarter;
group company or agent;
audiologist or FM operator;
school;
teacher or class;
patient;
FM devices (transmitters: interface unit F1 to Fn, receivers: adjustable devices D1 to Dk, accessories: also adjustable devices D1 to Dk;

Wherein: The audiologist or FM operator sets up and maintains an FM transmission system. The school stands for a site with one or more FM transmission systems, which could also be an airport, a shopping mall or any other place. Teacher or class could also stand for e.g. a cinema within a mall or a single location at a larger site.

Software modules can be defined for each level: For example, a teacher monitors the students with the interface unit I1 and/or uses commercially available software in order to configure and organize his transmission system (multimedia integration, group configuration). An interface unit I1 to In or an adjustable device D1 to Dk may contain a list of links to many levels.

An interface unit I1 to In for use by adults contain, in a more specific embodiment of the present invention, a link to data stored at the audiologist's level, a link to the local group company or also to headquarters.

Data Logging:

In a further embodiment of the present invention, the interface unit I1 to In transmits data logged within interface unit I1 to In and/or within adjustable devices D1 to Dk to the control unit 1, from where it may be collected for evaluation in a central database, as for example in a local storage unit 9 or a remote storage unit 13. Based on such evaluation, an updated optimum configuration may be made available in the control unit 1 for download into the interface unit I1 to In and/or into adjustable device D1 to Dk during the next session.

Peer-to-peer Programming:

In yet another embodiment, the interface unit I1 transmits its configuration parameters to a further interface unit I2 to In via the third link 7.

Having thus shown and described what is at present considered to be the embodiments of the invention, it should be noted that the same has been made by way of illustration and not limitation. Accordingly, all modifications, alterations and changes coming within the sprit and scope of the invention are herein meant to be included.

The invention claimed is:

1. A method for controlling a transmission system by adjusting one or more of its components comprising at least one interface unit and at least one adjustable device, the method comprising the steps of:
configuring the at least one interface unit according to interface configuration parameters,
enabling the at least one interface unit to operate according to the interface configuration parameters and to transmit data via a first link in a manner according to the interface configuration parameters,
transmitting device configuration parameters from the at least one interface unit to the at least one adjustable device via a second link,
configuring the at least one adjustable device according to the device configuration parameters, and
enabling the at least one adjustable device to operate according to the device configuration parameters and to transmit data via the second link in a manner according to the interface configuration parameters.

2. The method according to claim 1, further comprising the step of receiving the interface configuration parameters and the device configuration parameters into the at least one interface unit via the first link.

3. The method according to claim 1, further comprising the step of transmitting data via the second link in a unidirectional manner from the at least one interface unit to the at least one adjustable device.

4. The method according to claim 1, further comprising the step of transmitting data in a bidirectional manner via the second link.

5. The method according to claim 1, wherein the second link comprises a short-range link covering up to a distance of 1 meter between transmitter and receiver as well as a long-range link covering up to a distance of 100 meters.

6. The method according to claim 5, further comprising the steps of
transmitting the device configuration parameters via the short-range link, and
transmitting data via the long-range link.

7. The method according to claim 1, further comprising the steps of
transmitting the interface configuration parameters from the at least one interface unit to at least one further interface unit via a third link,
configuring the at least one further interface unit according to the configuration parameters,
enabling the at least one further interface unit according to the configuration parameters,
transmitting device configuration parameters from the at least one further interface units to at least one further adjustable device via a fourth link, configuring the at least one further adjustable device according to the device configuration parameters, and enabling the at least one further adjustable device according to the device configuration parameters in order to transmit data via the fourth link.

8. The method according to claim 7, further comprising the step of transmitting data via the fourth link in a unidirectional manner from the at least one further interface unit to the at least one further adjustable device.

9. The method according to claim 7, further comprising the step of transmitting data in a bidirectional manner via the fourth link.

10. The method according to claim 7, wherein the fourth link comprises a further short-range link covering up to a distance of 1 meter between transmitter and receiver as well as a further long-rang link covering up to a distance of 100 meters.

11. The method according to claim 10, further comprising the steps of transmitting the device configuration parameters via the further short-range link, and transmitting data via the further long-range link.

12. The method according to claim 1, wherein the interface configuration parameters and the device configuration parameters are received from a control unit into the at least one interface unit via the first link.

13. The method according to claim 1, further comprising the step of transmitting data in a bidirectional manner via the first link.

14. The method according to claim 1, further comprising the step of exchanging or receiving data and/or configuration parameters via a network to which at least one of a server, a remote server, an internal storage unit and an external storage unit is connected.

15. The method according to claim 14, wherein at least a part of the network belongs to the internet.

16. The method according to claim 1, further comprising the step of addressing at least one of the adjustable devices by a unique identification code.

17. The method according to claim 1, wherein the interface configuration parameters and the device configuration parameters originate from a common source.

18. A transmission system comprising
at least one interface unit,
at least one adjustable device,
means for configuring the at least one interface unit according to interface configuration parameters,
means for enabling the at least one interface unit to operate according to the interface configuration parameters and to transmit data via a first link in a manner according to the interface configuration parameters,
means for transmitting device configuration parameters from the at least one interface unit to the at least one adjustable device via a second link,
means for configuring the at least one adjustable device according to the device configuration parameters, and
means for enabling the at least one adjustable device to operate according to the device configuration parameters and to transmit data via the second link in a manner according to the interface configuration parameters.

19. The system according to claim 18, further comprising means for receiving the interface configuration parameters and the device configuration parameters into the at least one interface unit via the first link.

20. The system according to claim 18, further comprising means for transmitting data via the second link in a unidirectional manner from the at least one interface unit to the at least one adjustable device.

21. The system according to claim 18, further comprising means for transmitting data in a bidirectional manner via the second link.

22. The system according to claim 18, wherein the second link comprises a short-range link covering up to a distance of 1 meter between transmitter and receiver as well as a long-range link covering up to a distance of 100 meters.

23. The system according to claim 22, further comprising
means for transmitting the device configuration parameters via the short-range link, and
means for transmitting data via the long-range link.

24. The system according to claim 18, further comprising
means for transmitting the interface configuration parameters from the at least one interface unit to at least one further interface unit via a third link,
means for configuring the at least one further interface unit according to the configuration parameters,
means for enabling the at least one further interface unit according to the configuration parameters,
means for transmitting device configuration parameters from the at least one further interface units to at least one further adjustable device via a fourth link,
means for configuring the at least one further adjustable device according to the device configuration parameters, and
means for enabling the at least one further adjustable device according to the device configuration parameters in order to transmit data via the fourth link.

25. The system according to claim 24, further comprising means for transmitting data via the fourth link in a unidirectional manner from the at least one further interface unit to the at least one further adjustable device.

26. The system according to claim 25, wherein the fourth link comprises a further short-range link covering up to a distance of 1 meter between transmitter and receiver as well as a further long-rang link covering up to a distance of 100 meters.

27. The system according to claim 26, further comprising
means for transmitting the device configuration parameters via the further short-range link, and
means for transmitting data via the further long-range link.

28. The system according to claim 24, further comprising means for transmitting data in a bidirectional manner via the fourth link.

29. The system according to claim 18, wherein the interface configuration parameters and the device configuration parameters are receivable from a control unit into the at least one interface unit via the first link.

30. The system according to claim 18, further comprising means for transmitting data in a bidirectional manner via the first link.

31. The system according to claim 18, further comprising means for exchanging or receiving data and/or configuration parameters via a network to which at least one of a server, a remote server, an internal storage unit and an external storage unit is connected.

32. The system according to claim 31, wherein at least a part of the network belongs to the internet.

33. The system according to claim 18, further comprising the step of addressing at least one of the adjustable devices by a unique identification code.

34. The system according to claim 18, wherein an interface unit and an adjustable device are incorporated into a single unit.

\* \* \* \* \*